United States Patent [19]

Sutsko et al.

[11] Patent Number: 5,395,429
[45] Date of Patent: Mar. 7, 1995

[54] DIFFUSION PANEL FOR USE IN ULTRA-CLEAN ENVIRONMENTS AND METHOD FOR EMPLOYING SAME

[75] Inventors: Michael G. Sutsko, Glen Mills, Pa.; Douglas McKenna, Wilmington, Del.; Nelson A. George, North East, Md.

[73] Assignee: W. L. Gore & Associates, Inc., Newark, Del.

[21] Appl. No.: 81,773

[22] Filed: Jun. 23, 1993

[51] Int. Cl.⁶ .............................................. B01D 29/05
[52] U.S. Cl. ........................................ 95/273; 95/285; 55/502; 55/503; 55/511; 55/514
[58] Field of Search ................. 55/491, 495, 497, 499, 55/501–503, 511, 514, DIG. 5, 385.2; 95/46, 273, 285; 96/6

[56] References Cited

U.S. PATENT DOCUMENTS

| | | | |
|---|---|---|---|
| 2,172,771 | 9/1939 | Norris | 62/296 X |
| 2,692,654 | 10/1954 | Pryor | |
| 2,795,290 | 6/1957 | Butsch et al. | 55/527 X |
| 2,812,038 | 11/1957 | Krueger | |
| 3,003,581 | 10/1961 | Greason | |
| 3,032,868 | 5/1962 | Billner | 55/503 X |
| 3,154,393 | 10/1964 | Klein et al. | 55/501 |
| 3,220,915 | 11/1965 | Shannon | 161/149 |
| 3,252,400 | 5/1966 | Madl, Jr. | 98/40 |
| 3,277,638 | 10/1966 | Soltis | 55/495 X |
| 3,403,614 | 10/1968 | Carnes | 98/40 |
| 3,418,915 | 12/1968 | Marble | 98/40 |
| 3,502,530 | 3/1970 | Adams et al. | 55/511 X |
| 3,631,654 | 1/1972 | Riely et al. | 96/6 |
| 3,668,837 | 6/1972 | Gross | 96/6 |
| 3,782,082 | 1/1974 | Smith et al. | 55/494 |
| 3,903,660 | 9/1975 | Akins | 55/DIG. 16 |

(List continued on next page.)

FOREIGN PATENT DOCUMENTS

| | | | |
|---|---|---|---|
| 50551 | 2/1990 | Austria | |
| 56-076205 | 6/1981 | Japan | 96/6 |
| 57-007219 | 1/1982 | Japan | 55/514 |
| 2237518 | 5/1991 | United Kingdom | 55/495 |

OTHER PUBLICATIONS

Abstract: "Laminar Air Flow For Contamination Control In the Cleanroom," Lepco, Inc.; Oct. 1990.
Abstract: "Multi-Zone Cleanroom at Honeywell Optoelectronics"; Lepco, Inc.; Apr. 1990.
Abstract: "Energy Efficiency in Clean Rooms," Lepco, Inc., Sep. 1991.
Airo Clean Engineering Inc. Apr. 1991 Subject: Clean Rooms, 9 page brochure.
ASTM D737-75 Standard Test Method for Air Permeability of Textile Fabrics, pp. 219–221; Date: Unknown.
Instruction Manual: Mode AS1100 High Volume Stack Sampler Operation Manual; CS₃, Inc.; Aug. 12, 1993.
Literature: Cascase Stack Sampling Systems; CS₃, Inc.; Date: Unknown; ASTM D-4536.
Literature: "Avoid Turbulence"; Lepco Incorporated; Subject: Lepco's Membrane Diffusion System, Date: Unknown.
Catalog Literature of Various Air Filters (Catalog Numbers and Prices); attached literature of products available from various manufacturers through McMaster-Carr.

*Primary Examiner*—Robert Spitzer
*Attorney, Agent, or Firm*—David J. Johns

[57] ABSTRACT

An improved air diffusion panel, and method of construction and use, is provided which is particularly suitable for use in clean and ultra-clean environments, such as clean rooms and mini-environments facilities. The preferred diffusion panel of the present invention includes a diffusion membrane of a continuous mass of porous polytetrafluoroethylene bonded to one or more support screens of polymer mesh. The composite membrane and screens are mounted in a unique frame which eases the time and effort required for construction of the panels and which can be mounted to reduce vibration of the panel and leakage around its edges. This improved air diffusion panel also significantly filters small and sub-micron particles, resists chemical attack, and blocks liquid droplets.

20 Claims, 4 Drawing Sheets

U.S. PATENT DOCUMENTS

| | | | |
|---|---|---|---|
| 3,975,995 | 8/1976 | Shuler | 55/418 |
| 4,031,283 | 6/1977 | Fagan | 55/DIG. 16 |
| 4,060,025 | 11/1977 | Pelosi, Jr. | 55/508 X |
| 4,088,463 | 5/1978 | Smith | 55/502 X |
| 4,094,232 | 6/1978 | Howorth | 55/DIG. 29 |
| 4,177,149 | 12/1979 | Rosenberg | 96/6 X |
| 4,178,159 | 12/1979 | Fecteau | 55/502 X |
| 4,190,426 | 2/1980 | Ruschke | 96/6 |
| 4,267,769 | 5/1981 | Davis et al. | 55/DIG. 29 |
| 4,277,267 | 7/1981 | Posner | 55/494 |
| 4,340,402 | 7/1982 | Catron | 55/487 |
| 4,404,006 | 9/1983 | Williams et al. | 55/497 X |
| 4,409,889 | 10/1983 | Burleson | 55/385.2 X |
| 4,427,427 | 1/1984 | DeVecchi | 55/358 |
| 4,527,724 | 2/1986 | Rosenberg et al. | 96/6 |
| 4,554,766 | 11/1985 | Ziemer et al. | 52/28 |
| 4,603,618 | 8/1986 | Soltis | 98/31.5 |
| 4,853,013 | 8/1989 | Rio et al. | 96/6 |
| 4,929,262 | 5/1990 | Balon, Jr. et al. | 55/341.2 |
| 4,953,333 | 9/1990 | Carlson | 52/281 |
| 4,961,764 | 10/1990 | Develle et al. | 55/502 X |
| 5,019,140 | 5/1991 | Bowser et al. | 96/6 |
| 5,029,518 | 7/1991 | Austin | 98/31 |
| 5,053,064 | 10/1991 | Hama et al. | 55/270 |
| 5,057,217 | 10/1991 | Lutz et al. | 210/346 |
| 5,096,473 | 3/1992 | Sassa et al. | 95/285 X |
| 5,108,474 | 4/1992 | Riedy et al. | 55/497 X |

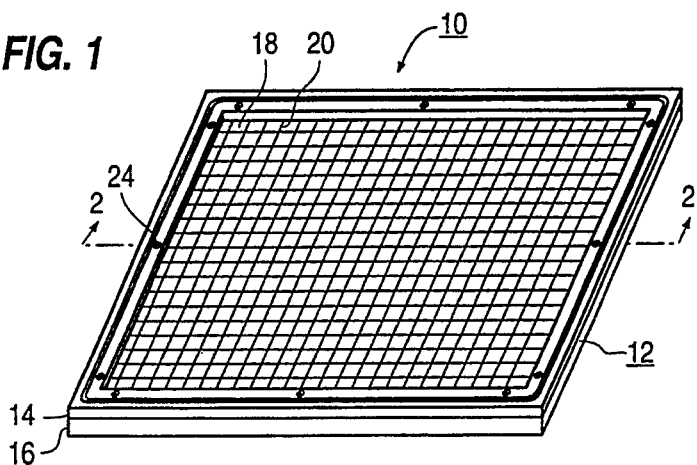
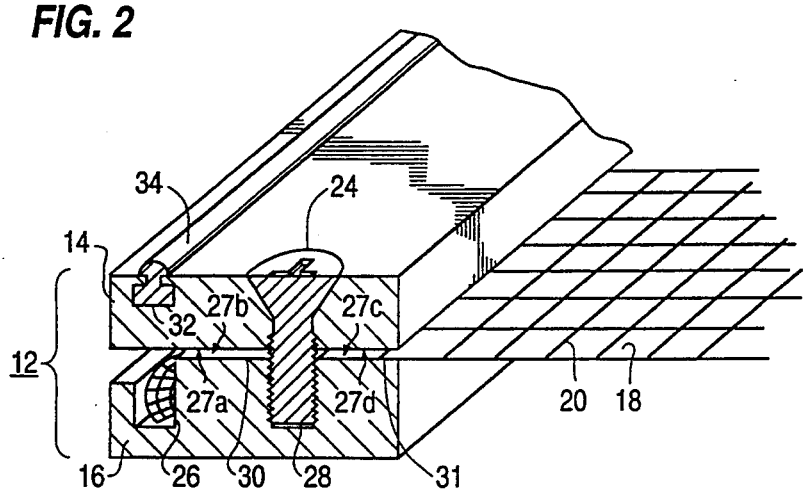
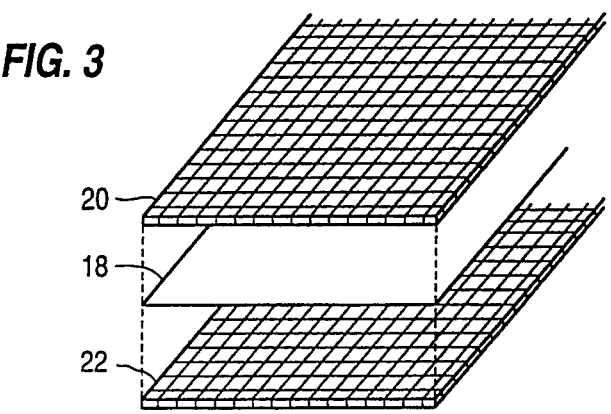

DIFFUSION PANEL FOR USE IN ULTRA-CLEAN ENVIRONMENTS AND METHOD FOR EMPLOYING SAME

BACKGROUND OF THE INVENTION

1. Field of the Invention

The present invention relates to apparatus and methods for filtering and diffusing air in an enclosed space and particularly in clean rooms and clean and ultra-clean environments.

2. Description of Related Art

Many industries are now demanding far greater purity and cleanliness standards than were ever previously required. For example, with the advent of smaller and faster semiconductors and other electronics, tolerances for contaminants have become a critical parameter in meeting standards, reducing waste, and maintaining profitability. Similarly, tighter contamination control standards are also a growing concern in a variety of other industries, such as pharmaceuticals, aerospace, food, medical products, surgical environments, etc.

To address these requirements, clean rooms and ultra-clean rooms have been developed with extremely low ambient contamination levels. Examples of such structures are disclosed in numerous patents, including U.S. Pat. Nos. 4,409,889 issued Oct. 18, 1983, to Burleson, 4,267,769 issued May 19, 1981 to Davis et al., 4,953,333 issued Sep. 4, 1990, to Carlson, and 5,029,518 issued Jul. 9, 1991, to Austin. Moreover, smaller and less expensive environments have been developed which are extremely clean, essentially human-free, housings for process equipment, such as mini-environments and micro-environments in the semiconductor industry and those employing barrier isolation technologies in the pharmaceutical industry.

In order to maximize the benefits of these new ultra-clean areas, every aspect of the environment must be carefully controlled and monitored. Central to every clean room facility is an effective ventilation and air filtering system which tightly contains the size and number of air borne particles. Examples of various ventilation systems are disclosed in U.S. Pat. Nos. 3,975,995 issued Aug. 24, 1976, to Shuler, 4,094,232 issued Jun. 13, 1978, to Howorth, 4,554,766 issued Nov. 26, 1985, to Ziemer, 4,929,262 issued May 29, 1990, to Balon, Jr. et al., and 5,053,064 issued Oct. 1, 1991, to Hama et al.

Among the concerns in developing an effective ventilation system is that the flow of air from ventilation conduits must be sufficiently laminar and uniformly distributed so as not to disrupt operating conditions or produce turbulence. One example of such a diffusion device is disclosed in U.S. Pat. No. 4,603,618 issued Aug. 5, 1986, to Soltis. In order to achieve proper diffusion and laminar (non-turbulent) air flow from a conventional HEPA (High Efficiency Particular Absolute) filtered air system, U.S. Pat. No. 4,603,618 forms a second plenum across the ceiling of a clean room and then installs a number of translucent diffusion panels therein. The panels include translucent fibrous sheets of controlled porosity wrapped around the edge of the panels and held in place with a clip. The fibrous sheets permit the passage of both filtered air and light from light fixtures mounted above the panels. One of the asserted advantages of such a system is that the diffusion panels are mounted in a conventional T-bar grid without the use of gaskets or sealants.

While the diffusion panels disclosed in U.S. Pat. No. 4,603,618 may function adequately well for their stated purposes, they suffer from a number of serious deficiencies. First, if not properly controlled, the fibrous sheets employed in these panels are believed to shed fibers or particulates, leading to a certain amount of contamination from the panels themselves. Second, the use of a non-woven material also tends to be less uniform in mass variation which leads in turn to less uniformity in flow. Third, the intentional loose fitting of the diffusion panels into conventional T-bar grids leaves open the risk of contamination passing around the perimeter of the panels, particularly if the panels are not prevented from vibrating in place. Fourth, the wrap-around fabrication method employed in the Soltis patent tends to be burdensome to construct and often leads to uneven tensioning of the diffusion panel in the frame. Other problems with the Soltis diffusion panels are believed to include: inability to filter small and sub-micron particles adequately, such as those released from even the cleanest ULPA filters or duct mechanisms; use of a relatively large grid support structure downstream reduces performance of the diffusion material; lack of adequate structural integrity in panel design-leading to possible leakage or failure; and inability to prevent water contamination.

Another problem not addressed by any of the above references is how to provide contamination protection in micro-environment and mini-environment clean facilities. In these instances, each contained environment can be supplied by its own air duct. As such, the air stream tends to be more direct and focused and in greater need of redistribution. Since these facilities are normally employed under extremely clean conditions, a greater degree of filtration is also ordinarily required for these systems.

Accordingly, it is a primary purpose of the present invention to provide a diffusion panel for a clean or ultra-clean environments which minimizes contamination by providing a high degree of diffusion and filtration efficiency.

It is a further purpose of the present invention to provide such a diffusion panel which can be tightly installed in a variety of air filtration ducts and which is not prone to vibration or seepage of air around the perimeter of the panel.

It is yet another purpose of the present invention to provide such a panel which is an effective barrier to many different contaminates, including condensates and other liquids which may be present in an air supply duct.

It is still another purpose of the present invention to provide such a panel which is suitable for use in filtering and diffusing air in mini- and micro-environment facilities.

It is a further purpose of the present invention to provide a method of constructing such a diffusion panel which is straightforward and readily accommodates providing even tensioning of the diffusion membrane.

These and other purposes of the present invention will become evident from review of the following specification.

SUMMARY OF THE INVENTION

The present invention is an improved diffusion panel for use in filtering contamination from an air stream and a method of making and using such a panel.

In one basic form, the diffusion panel of the present invention comprises a combination of a frame defining an open space therein, a continuous mass membrane of porous polytetrafluoroethylene (PTFE) stretched across the open space of the frame, and a screen backing the membrane and providing support for it. A membrane of expanded PTFE is especially preferred in that it can be supplied with a wide range of porosities to control specific filtration properties. Preferably the membrane and the screen are bonded together to help improve performance and ease in handling.

Among the distinct advantages of such a panel is that it has a high degree of diffusion and filtration efficiency, while avoiding many of the problems which have plagued previous diffusion panels, such as shedding, compromise by condensate or other liquids, and susceptibility to chemical attack. A further improvement of the present invention comprises providing a sealing means around the periphery of the diffusion panel so as to avoid leakage around the panel's edge and to reduce undesirable vibration.

The present invention also employs an improved method of construction which reduces assembly time and labor while assuring that the diffusion membrane is evenly tensioned in the frame.

Although the diffusion panel of the present invention can be used in virtually any application where conventional diffusion panels can be employed, due to its improved properties, the diffusion panel of the present invention is particularly suited for use in the close confines of mini-environment facilities and other duct systems.

DESCRIPTION OF THE DRAWINGS

The operation of the present invention should become apparent from the following description when considered in conjunction with the accompanying drawings, in which:

FIG. 1 is an isometric view of one embodiment of a diffusion panel of the present invention;

FIG. 2 is an enlarged cross-sectional view of the diffusion panel of the present invention taken along line 2—2 of FIG. 1;

FIG. 3 is an exploded view of screen and membrane members of the present invention;

DETAILED DESCRIPTION OF THE INVENTION

Figure 6:
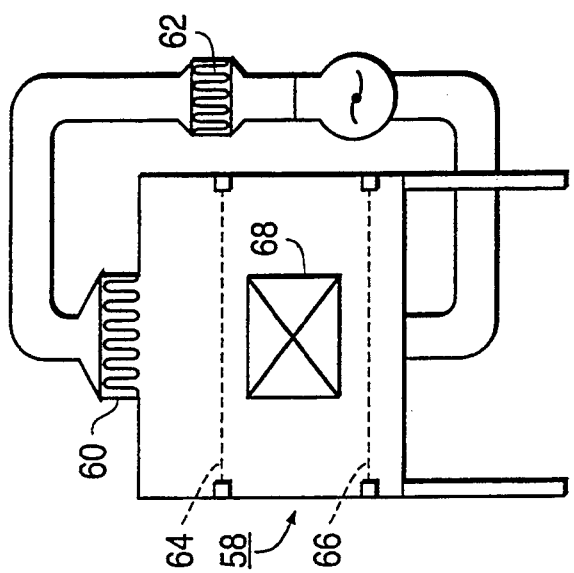
FIG. 6 is a partially schematic elevational view of yet another embodiment of a mini-environment facility incorporating a diffusion panel of the present invention.

The present invention is an improved diffusion panel suitable for use in a variety of applications where a stream of air must be filtered and/or diffused to produce a clean, laminar flow of air and remove contaminants therefrom. The diffusion panel of the present invention is particularly useful for filtering and diffusing air in a clean or ultra-clean environments, and especially in mini-environments.

As used herein, the terms "clean" and "ultra-clean" are intended to include any facility which must be maintained with reduced or greatly reduced ambient contamination levels, such as those facilities commonly employed in the electronic and pharmaceutical industries (although the use of the present invention is not necessarily limited to such industries). Generally, the term "clean" refers to a facility with a contaminate level of class 1000 to class 10; the term "ultra-clean" refers to a facility with a contaminate level of class 1 or cleaner.

The term "contaminants" as used herein is intended to encompass a variety of undesirable impurities and conditions which may be present in any stream of air. Such contaminants include: particulate matter, such as dust or similar air-borne particles; fibers; aerosol of sub-micron size; liquid droplets; chemical agents; and turbulent or non-laminar air flow.

The term "mini-environment" is intended to encompass any clean or ultra-clean facility adapted to surround one or more pieces of specific process equipment or similar apparatus to shield the apparatus from contamination. Other common terms for such facilities are micro-environments, ventilation chambers, glove boxes, isolation barriers, enclosures, and clean islands. Workers generally will not be contained in such facilities, but have access through restricted openings, sealed gloves, mechanical arms, air curtains, or similar means. Such facilities may or may not be housed in a larger clean room facility.

As is shown in FIGS. 1 and 2, the diffusion panel 10 of the present invention comprises a frame 12 having an upper rack 14 and a lower rack 16, a continuous mass porous membrane 18, and a screen 20 mounted on at least one side of the membrane 18. The panel 10 is adapted to be mounted in an air conduit to screen the flow of air therethrough.

In order to provide exceptional filtration and to produce a smooth, laminar flow through an air conduit, the continuous mass membrane is preferably a continuous mass (non-fibrous) membrane of porous polytetrafluoroethylene (PTFE), and especially such a continuous membrane made from expanded PTFE in accordance with the teachings of U.S. Pat. No. 3,953,566 issued Apr. 27, 1976, to Gore. The ideal membrane produces an air flow of about 90 fpm with a permeability of about 200 frazier (200 feet per min (fpm) at ⅛" pressure drop). This quantity can be determined in accordance with ASTM Standard D 737 which defines permeability in terms of velocity of air in feet per minute. Lower permeability and higher pressure drop results in increased flow uniformity.

By way of summary, "frazier number" is a common measure of permeability in textile manufacture. The term refers to a Frazier Permeability Tester made by the Frazier Precision Instrument Company, Gaithersburg, Md. This machine incorporates orifice plates, inclined manometers, and a fan into a workbench. The textile to be tested is spread over the workbench top and a framework is lowered across the workbench such that a suspended fitting captures a test region of the textile within a flow chamber. The fan is then started and its speed adjusted until one manometer reads 0.5 of $H_2O$; the other manometer is then read to find the pressure drop across the series orifice plate. A table or graph can then be consulted to determine the velocity through the textile in feet per minute (fpm)/(0.5 in $H_2O$).

The membrane should have a filtration efficiency of at least 50 to 99+% at 0.1 micron. Filtration efficiency may be measured by any suitable method, such as dual laser spectrometry of air flow sampled from upstream and downstream of the filter with a generated aerosol of atomized solution, DOP, PSL, NaCl, or any other accepted aerosol generation method.

By forming the membrane 18 from a continuous mass of material, a cleaner and more even flow can be achieved through the diffusion panel. Not only is the continuous membrane more efficient at filtering the air of contaminants, but it also is far less prone to breakdown and shedding of materials, as is apt to occur with some fibrous materials. Another distinct advantage of providing a membrane of expanded PTFE as is described above is that the membrane is highly water resistant and resistant to attack by most common process chemicals.

In order to provide support to the continuous membrane and assist in holding the membrane in place and in shape during operation, a screen 20 is provided on at least one side of the membrane. The screen 20 may comprise any suitable polymer, metal or other material which will supply adequate support. Depending upon application, the screen 20 may comprise a material which is woven, molded, bonded, non-woven, etc. of any appropriate openness or filament size. Preferably, the screen 20 should be provided on the intended downstream side of panel 10 so as to aid in supporting the membrane 18 in the stream of air through the conduit.

Ideally, the screen comprises a layer of any environmentally compatible material which provides adequate support while not restricting air flow through the membrane 18. The preferred screen comprises a polymer mesh, such as polypropylene or polyester, with the following properties: clean; non-shedding; non-outgassing; and resistant to chemical attack.

Although not required, it is preferred that the screen 20 is bonded to the membrane 18 to form a composite laminate. As so constructed, the composite laminate can be easily handled and easily installed within the frame 12. Moreover, the composite laminate tends to retain its original shape, size, and filtration parameters for a longer period of time than materials which are applied separately. The bonding may comprise any suitable means, including through application of adhesive, by heat-sealing, by sonic welding, through impregnation of the membrane within the screen, or any other appropriate method.

The preferred composite laminate is illustrated in the exploded representation of FIG. 3. In this embodiment, the membrane 18 is bonded on one side to a screen 20 of polymer mesh. On the opposite side, a second screen member 22 is installed to give greater support. The second screen member 22 may take any suitable form, but generally should include the same properties as screen member 20. The provision of screen members on both sides of the membrane also makes the panel more versatile (e.g. allowing it to be installed without a particular directional orientation, supporting the membrane in the event of a reversal of flow through the conduit, etc.). Although not required, the second screen member 22 may likewise be bonded to the membrane 18.

As has been explained, previous diffusion panel designs, such as that shown in U.S. Pat. No. 4,603,618, stretched the diffusion membrane around the periphery of a frame and then held it in place with clips or similar means. Although this construction method can produce a taught and relatively secure fit, it tends to be labor intensive and requires careful manipulation of the diffusion membrane to assure even tensioning of the membrane. Although a fibrous membrane is somewhat forgiving in this regard, a continuous mass membrane such as that employed in the present invention can be significantly distorted if not stretched properly in this regard.

To address these concerns, the frame of the present invention employs an entirely different concept to anchor the membrane 18 in place. The frame 12 of the present invention comprises an upper rack 14 and a lower rack 16 which sandwich around the membrane 18 and screen 20 and hold the membrane and screen elements in place through merely a tight fit between the rack elements. It should be appreciated that the terms "upper" and "lower" are applied to the racks for convenience in identification and are not intended to limit the positioning or use of the racks. Further, for ease in inventory and construction it may be desirable to construct the racks from identical frame stock, in which case the two racks would be completely interchangeable. The racks 14, 16 may be constructed from any suitable material, including aluminum, plastic, wood, composites, etc.; the preferred construction comprises anodized aluminum or stainless steel.

To assist in holding the racks 14, 16 together, a series of threaded screws or bolts 24, clips, or similar elements are installed around the perimeter of the frame. Ideally, the bolts 24 should be flat-headed and/or attached within recesses to assure a flush fit within the frame 12.

Among the advantages of this construction method is that it allows the frame 12 to be securely mounted around the membrane 18 while it is being held taught by processing equipment or other stretching means. This is a fast, easy, and straightforward way to assure that the membrane is properly tensioned when installed.

The preferred method of installation of the membrane (with or without the screen) comprises stretching the membrane across the lower frame, attaching the upper frame to the lower frame, releasing the tension on the membrane, and cutting any excess material extending out from around the edge of the frames. To improve the presentation of the final product, the lower rack includes an internal groove 26 which allows the outer edge of the membrane to be tucked within the slot 26 once its has been trimmed to size.

To aid in holding the membrane in a taught presentation within the frame, a series of raised ridges or nodes 27a, 27b, 27c, 27d are provided around part or all of the frames. These nodes 27 serve to grip the membrane and assist it from slipping from within the frame.

As is shown in FIGS. 1 and 2, a channel 28 is provided in the lower rack into which the bolts 24 attach. Although prethreaded holes can be provided to receive the bolts, the assembly of the frame is significantly eased if precise alignment of the bolts and holes is not required. In this embodiment, the bolts 24 self-tap into place within the channel 28. The bolts 24 pass through the membrane 18 and provide a more secure anchorage for the membrane. Additionally, as FIG. 2 illustrates, the membrane and screen laminate is held tightly against the upper rack 14 in the first raised area 30 between the groove 26 and channel 28, and in the second raised area 31 between channel 28 and the inner edges of the frame.

Another problem already noted with some previous diffusion panels is that they are not always secure in their attachment within an air duct. This can lead to leakage of air around their periphery and also can lead to undesirable rattles and vibrations in air circulation systems. To address this problem, an external groove 32 is provided in at least one of the racks adapted to receive sealant material 34. The sealant material 34 forms a snug fit against a ledge, shelf, or other support means for the diffusion panel in the air system. This vastly reduces or eliminates vibration and leakage. The sealant can take any form, including gaskets formed from elastomers, rubber, vinyl, fluoroelastomers, etc. The preferred sealant comprises a beading of expanded PTFE, such as that available from W. L. Gore & Associates, Inc., of Elkton, Md., under the designation GORE-TEX glazing. This material forms a tight fit while being waterproof and resistant to chemical attack.

The diffusion panel 10 of the present invention can be installed in virtually any application where filtration and/or diffusion of a stream of air (e.g. ambient atmosphere, oxygen, process gases, etc.) is desired. Among the anticipated uses of the present invention are: in the air plenums of existing clean room facilities; interspersed in air ducts, and especially at bends, corners, or junctions in air ducts where reestablishment of laminar flow is desired; at storage racks or other areas in a facility where smooth air flow may be required; etc.

Among the more promising applications for the present invention is in mini-environment facilities, with or without the use of HEPA filter units. These facilities are particularly unique in that they are quite restricted in size and air flow from a ventilation system is often necessarily focused directly on the process equipment contained therein. Accordingly, in this context diffusion of air must be highly effective and there is little room for risk of leakage or incidental contamination.

Another problem which can be accentuated in this environment is that liquids can spray either upstream or downstream from the panel and cause contamination with the passage of liquid droplets through the panel. Among the benefits of the continuous mass PTFE membrane employed with the present invention is that the membrane is highly water resistant and will not permit the passage of water or other liquids under these circumstances.

Figure 5:
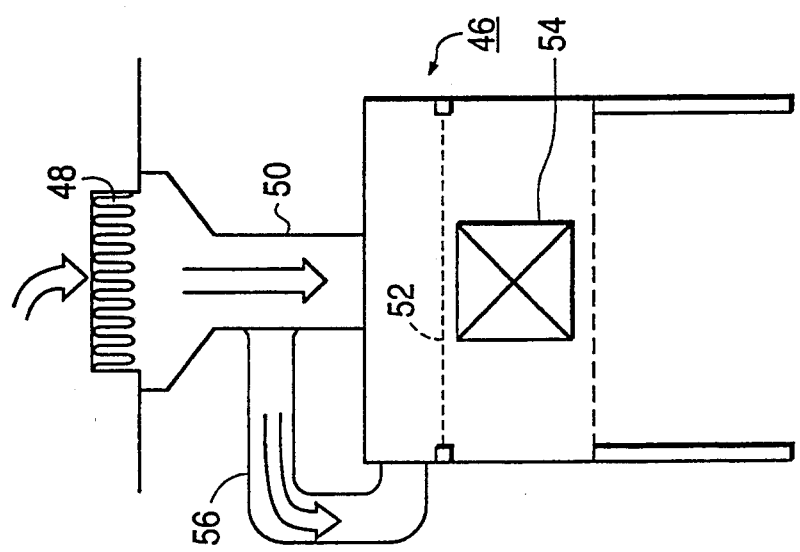
FIG. 5 is a partially schematic elevational view of another embodiment of a mini-environment facility incorporating a diffusion panel of the present invention.
Figure 4:
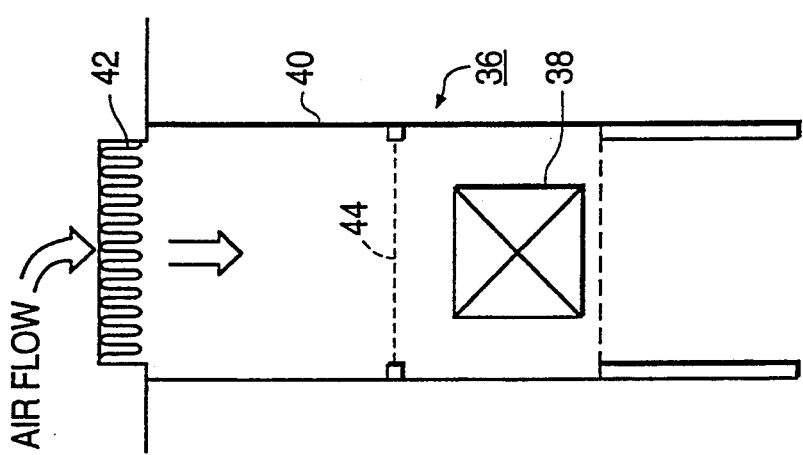
FIG. 4 is a partially schematic elevational view of one embodiment of a mini-environment facility incorporating a diffusion panel of the present invention.

Examples of possible uses of such membranes in a mini-environment facility are shown in FIGS. 4 through 6. FIG. 4 illustrates a mini-environment facility 36 housing a piece of process equipment 38 and including an air conduit 40. A conventional HEPA filter 42 is provided in the air conduit 40 upstream from the process equipment 38 and a diffusion panel 44 of the present invention is interposed therebetween. Due to the exceptional diffusion properties of the diffusion panel 44 of the present invention, it can be mounted in close proximity to the process equipment 38.

Application of the present invention in conjunction with a slightly different configuration of mini-environment facility 46 is shown in FIG. 5. In this instance, air passes through a HEPA filter 48 and then through a restricted air conduit 50. Again, the diffusion panel 52 of the present invention is mounted at the base of the air conduit 50 over the process equipment 54. An alternative air conduit 56, avoiding direct air flow toward the process equipment 54, is also illustrated.

A third application of the present invention in a mini-environment facility 58 is shown in FIG. 6. In this ultra-clean environment, a HEPA filter 60, 62 is used in one of two locations. To assist in providing laminar flow throughout the air circulation system, diffusion panels 64, 66 of the present invention may be provided on either the exhaust or intake sides the air circulation system on either side of the process equipment 68.

It should be evident from these examples that numerous other applications of the present invention can be employed without departing from the present invention.

Figure 7:
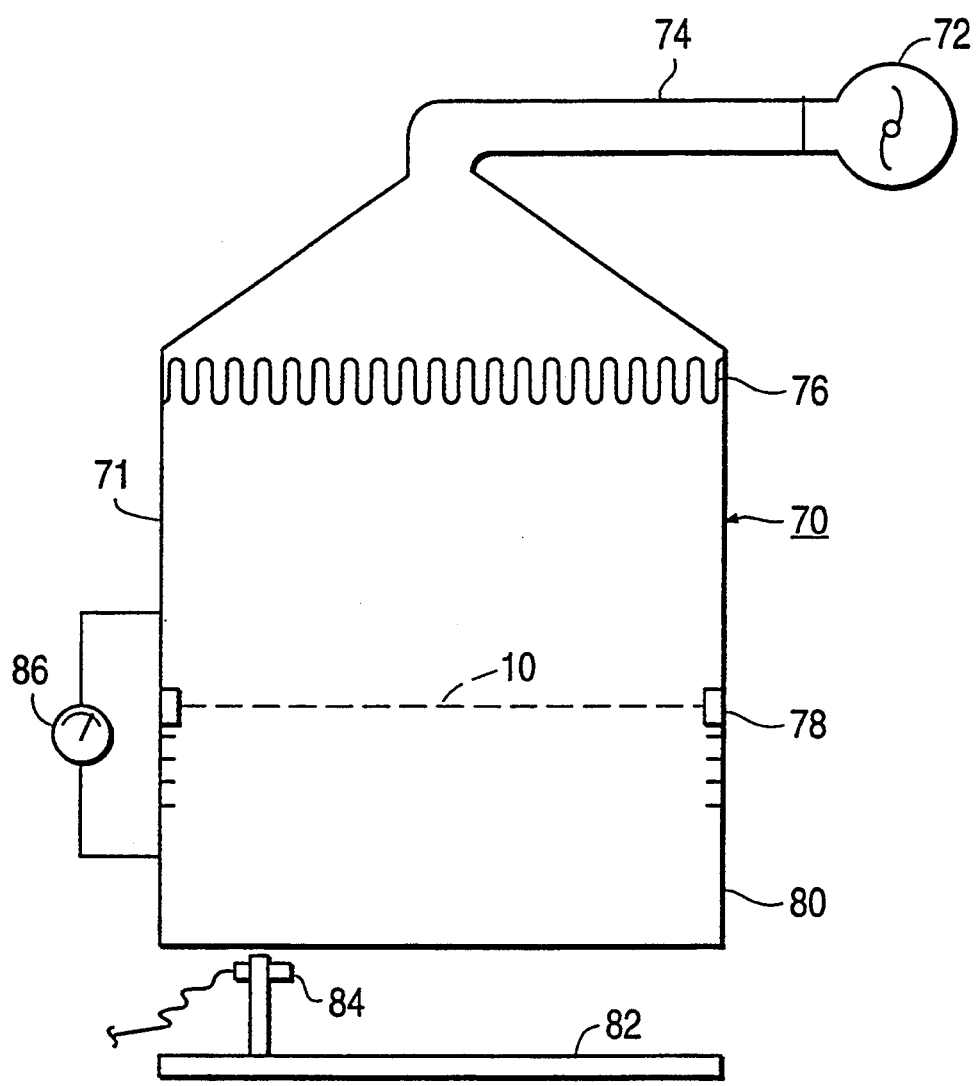
FIG. 7 is a partially schematic elevational view of an apparatus used to test the diffusion panels of the present invention.

An apparatus 70 used to test the diffusion panels of the present invention is shown in FIG. 7. This apparatus comprises an upper plenum 71, a blower 72, an air conduit 74, a removable HEPA filter 76, a variable height support 78 for a diffusion panel 10 with a 2'×4' lower plenum 80 provided thereunder. An x,y grid 82 is provided on which an adjustable hot-wire anemometer 84 is positioned. The anemometer 84 can be any air flow measurement device, such as a SOLOMAT 500e anemometer available from Solomat Inc. of Norwalk, Conn. The anemometer 84 is adjustable in both its position on the x,y grid 82 and in its height to any position within the lower plenum 80. A manometer 86 is also provided to measure the relative pressures between upper plenum 71 and lower plenum 80.

Employing this test apparatus, the following types of results can be obtained from any diffusion panel tested: mean air flow; percent variability; percent turbulence; changes in pressure; etc.

Figure 8:
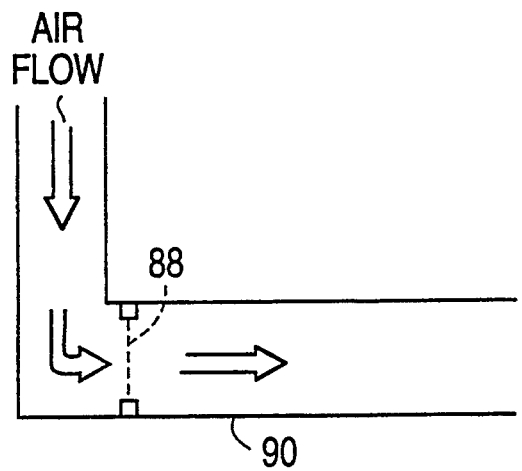
FIG. 8 is a schematic representation of another application for the panel of the present invention.
Figure 9:
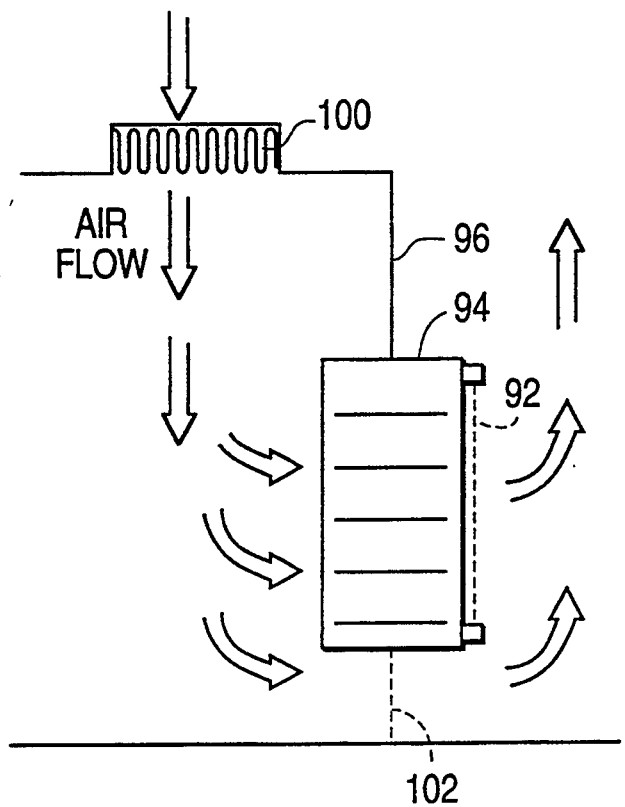
FIG. 9 is yet another schematic representation of a further application for the panel of the present invention.

Other applications of the present invention are illustrated in FIGS. 8 and 9. FIG. 8 demonstrates how a diffusion panel 88 of the present invention can be mounted at a bend or junction in an air conduit 90. Inserted in this manner, more even air flow can be established and maintained within the air conduit despite turbulence inherent with the change of air flow direction.

FIG. 9 demonstrates how a diffusion panel 92 of the present invention can be used to reduce air turbulence through a storage rack 94 in a clean room 96. Air enters the clean room 96 through HEPA filter 100 and passes out of the room through air return 102 and the back of storage rack 94. The presence of the diffusion panel 92 assures that air flow passing through the rack will be laminar.

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. A method of providing air filtration through a conduit in communication with an ultra-clean environment, which comprises:

provide a diffusion panel comprising a frame adapted to be mounted in the conduit;

attaching a membrane of porous polytetrafluoroethylene (PTFE) within the frame, the membrane having a filtration efficiency of at least 50% and being resistant to liquid penetration and chemical attack;

reinforcing the membrane within the frame with at least one screen;

mounting the frame within the conduit so as to cause substantially all of the flow of air through the conduit to pass through the membrane;

filtering and diffusing the air passing through the conduit of contamination by passing the air through the membrane in the diffusion panel so as to create a uniform, laminar flow of air downstream of the panel.

2. The method of claim 1 which further comprises reinforcing the membrane by providing a mesh screen and laminating the screen to the membrane.

3. The method of claim 2 which further comprises providing a frame including an upper rack and a lower rack; and attaching the membrane within the frame by placing it between the upper rack and the lower rack and securely anchoring the upper and lower racks together.

4. An apparatus for use in filtering and diffusing a stream of air in an ultra-clean environment, which comprises:

a frame;

a continuous mass membrane of porous expanded polytetrafluoroethylene (PTFE) mounted within the frame, the membrane providing uniform air flow therethrough and resistance to water penetration and chemical attack; and a screen mounted on at least one side of the membrane to assist in supporting the membrane;

wherein the apparatus is adapted to be mounted in an air conduit, providing a smooth, laminar air flow through the conduit.

5. The apparatus of claim 4 wherein the screen comprises a polymer mesh laminated to the membrane.

6. The apparatus of claim 5 wherein the polymer mesh is selected from the group consisting of polypropylene and polyester.

7. The apparatus of claim 4 wherein
the apparatus is mounted in an air conduit of predetermined dimensions; and
the frame has a periphery corresponding in dimensions with the dimensions of the air conduit, the periphery of the frame comprising an upper rack and a lower rack;
wherein the membrane is held tightly in place between the upper and lower racks.

8. The apparatus of claim 7 wherein
the frame defines an open area therewithin;
the membrane is mounted across the entire open area; and
the screen is mounted across the open area, parallel to the membrane.

9. The apparatus of claim 7 wherein the frame includes a series of nodes to assist in holding the membrane in place.

10. The apparatus of claim 7 wherein the frame includes a groove along its outside periphery adapted to receive beading to resist leakage of air around the edge of the frame.

11. The apparatus of claim 10 wherein the beading mounted in the groove comprises an expanded PTFE.

12. The apparatus of claim 4 wherein the porosity of the membrane is sufficient to resist downstream propagation of contamination.

13. The apparatus of claim 1 wherein the membrane comprises a filtration efficiency of at least 50%.

14. The apparatus of claim 4 wherein the apparatus is mounted in an air conduit to a mini-environment clean facility housing process equipment to filter contamination in the form of air borne particles and air turbulence from entering the facility.

15. A diffusion panel for use in an air conduit communicating with an ultra-clean facility, which comprises:

a continuous mass membrane of porous polytetrafluoroethylene (PTFE), the membrane serving to filter air borne contaminates, to diffuse air flow into a uniform stream, to resist liquid penetration through the diffusion panel, and to resist chemical attack;

a frame to stretch the membrane across the air conduit and direct air therethrough;

wherein the diffusion panel is adapted to be mounted in an air conduit, providing a smooth, laminar air flow through the conduit.

16. The diffusion panel of claim 15 wherein a screen is provided across the frame to assist in supporting the membrane.

17. The diffusion panel of claim 16 wherein the screen comprises a laminate bonded to the membrane.

18. The diffusion panel of claim 16 wherein the screen comprises a first member mounted on one size of the membrane and a second member mounted on the other size of the membrane.

19. The diffusion panel of claim 18 wherein at least one of the screen members comprises a mesh selected from the group consisting of polypropylene, polyester, PTFE, ePTFE, fluoropolymer, aluminum, or stainless steel.

20. The diffusion panel of claim 15 wherein the membrane comprises a sheet of expanded PTFE with a filtration efficiency of between 50 and 99% at 0.1 micron.

* * * * *